United States Patent
Okubo et al.

[11] Patent Number: 5,458,156
[45] Date of Patent: Oct. 17, 1995

[54] STAINLESS STEEL MULTIFOLD PIPE

[75] Inventors: Naoto Okubo, Tokuyama; Yoshihiro Uematsu, Kudamatsu; Katsuhisa Miyakusu, Shinnanyo; Takashi Igawa, Yamaguchi; Yukio Oda, Shinnanyo; Yukito Nomura; Koichi Satake, both of Koga; Juichi Ozawa, Satte, all of Japan

[73] Assignees: Nisshin Steel Co., Ltd.; Sanoh Kogyo Kabushiki Kaisha, both of Tokyo, Japan

[21] Appl. No.: 143,400

[22] Filed: Oct. 29, 1993

Related U.S. Application Data

[63] Continuation of Ser. No. 916,753, Jul. 22, 1992, abandoned.

[30] Foreign Application Priority Data

Jul. 26, 1991 [JP] Japan .................................. 3-208832

[51] Int. Cl.$^6$ ........................................................ F16L 9/14
[52] U.S. Cl. ............................ 138/145; 138/143; 138/140; 138/172; 138/DIG. 6
[58] Field of Search .................................. 138/145, 144, 138/DIG. 6, 170, 171, 146, 140, 143, 172; 420/51, 53; 427/185; 428/623, 624, 626

[56] References Cited

U.S. PATENT DOCUMENTS

| | | | |
|---|---|---|---|
| 3,957,086 | 5/1976 | Gondek | 138/DIG. 6 |
| 4,102,677 | 7/1978 | Deverell | 420/53 |
| 4,141,762 | 2/1979 | Yamaguchi et al. | 420/53 |
| 4,312,902 | 1/1982 | Murase et al. | 138/145 |
| 4,505,946 | 3/1985 | Suzuki et al. | 427/185 |
| 4,999,159 | 3/1991 | Uematsu et al. | 420/51 |
| 5,297,587 | 3/1994 | Johnson | 138/DIG. 6 |

FOREIGN PATENT DOCUMENTS

| | | | |
|---|---|---|---|
| 352323 | 7/1931 | United Kingdom | 138/170 |

*Primary Examiner*—David Scherbel
*Assistant Examiner*—Patrick F. Brinson
*Attorney, Agent, or Firm*—Lowe, Price, LeBlanc & Becker

[57] ABSTRACT

A multifold pipe made by multiple rolling up and turning of a copper coated steel sheet into a multifold pipe, characterized in that said steel sheet is a cold rolled sheet of a super soft austenitic stainless steel comprising by weight: up to 0.05% of C, up to 1.0% of Si, up to 5.0% of Mn, from 9.0% to 15.0% of Ni, from 15.0% to 20.0% of Cr, up to 0.04% of N, up to 5.0% of Cu, the balance being Fe and unavoidable impurities, wherein the alloying elements are further adjusted so that both the two relations (1) and (2) noted below are satisfied:

$$K=20.5+13.0\times C+0.99\times Si-1.1\times Mn-Ni-0.4\times Cu+0.4\times Cr+117.1\times N \leq 19.5 \quad (1)$$

$$H=27.1+60.9\times C+0.26\times Si-Ni-0.79\times Cu+0.68\times Cr+52.6\times N \leq 29.0 \quad (2)$$

The multifold pipe according to the invention is excellent in fluid tightness of its fused part and in corrosion resistance.

10 Claims, 6 Drawing Sheets

STAINLESS STEEL MULTIFOLD PIPE

This application is a continuation of application Ser. No. 07/916,753 filed Jul. 22, 1992 now abandoned.

FIELD OF THE INVENTION

The invention relates to multifold pipes (typically twofold pipes or double tubes) usable as fuel pipes and oil hydraulic pipings such as brake tubes of automobiles, and as heat discharge pipes for refrigerator. More particularly, it relates to multifold pipes of tubes made of copper coated soft austenitic stainless steels having an extremely low hardness.

PRIOR ART

Figure 1A:
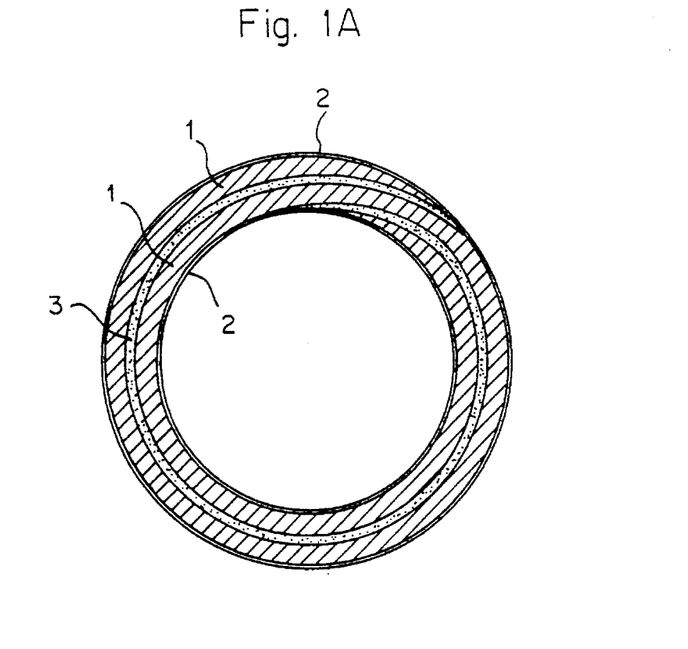
FIGS. 1A and 1B schematically depict first and second embodiments of the invention showing a radial cross-section of a twofold pipe (double tube)
Figure 1B:
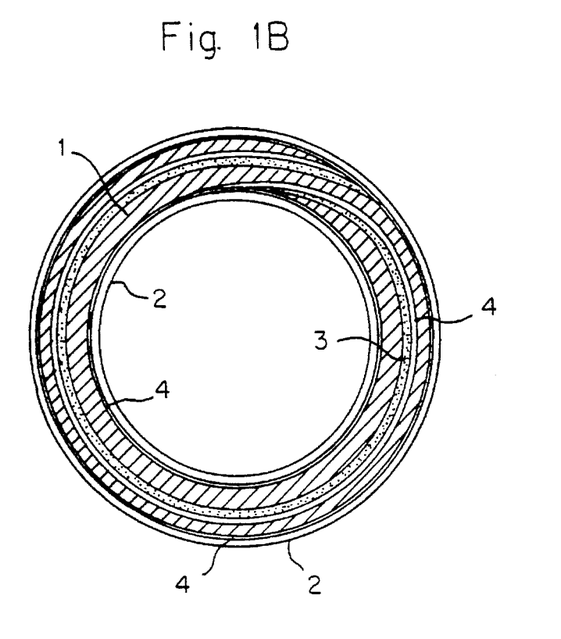

Multifold pipes are normally produced by rolling up and turning a copper coated steel strip by means of pipe forming rolls to form a pipe and heating the so formed pipe to a temperature higher than the melting point of copper under atmosphere of a reducing gas. Self brazing occurs when any pair of copper coatings in contact with each other fuse to a form a fused layer. FIG. 1A schematically depicts a radial cross-section of a twofold pipe (double tube). In FIG. 1A, reference numeral 1 designates a steel strip, reference numeral 2 a copper coating and reference numeral 3 a fused layer formed by self-brazing. FIG. 1B depicts a second embodiment of a two fold pipe wherein a nickel coating 4 is applied to the steel strip 1 followed by the copper coating 2. As a starting steel for the production of multifold pipes, low carbon mild steels are generally employed on account of pipe formability of the starting steel and workability of the pipe produced. While the starting steel can be called a steel strip since it is in the form of coil at the time of the pipe production, it will be referred to herein as a steel sheet.

PROBLEMS THE INVENTION AIMS TO SOLVE

To improve the corrosion resistance of multifold pipes made of mild steels for safety's sake, it has been known to use thicker starting steel sheets and/or to apply various metallic and resinous coatings to multifold pipes made of mild steels. Such measures such as the use of thicker steel sheets and application of coatings, however, pose problems of increases in material and manufacturing costs as well as increases in material and product weights.

On the other hand, to ensure corrosion resistance of the starting steel itself, it has also been proposed to use stainless steels as a starting steel for the production of multifold pipes. However, when compared with mild steels, stainless steels are generally hard and work hardened to a great extent. Therefore, stainless steels, when used in the production of multifold pipes, invite problems wherein shape and adhesion at the time of pipe formation are not good, and voids frequently occur in the fused layer formed by self-brazing, thereby impairing liquid tightness, which is an inherent requirement for pipes. Void occurrence can be checked by non-failure detection, typically by eddy current defect detection.

An object of the invention is to provide a multifold pipe having enhanced corrosion resistance in which stainless steel is used as a material steel and in which the above-discussed problems associated with multifold pipes made of stainless steels have been solved.

SUMMARY OF THE INVENTION

The invention provides a multifold pipe made by multiple rolling up and turning of a copper coated steel sheet into a multifold pipe, characterized in that said steel sheet is a cold rolled sheet of a super soft austenitic stainless steel comprising by weight: up to 0.05% of C, up to 1.0% of Si, up to 5.0% of Mn, from 9.0% to 15.0% of Ni, from 15.0% to 20.0% of Cr, up to 0.04% of N, up to 5.0% of Cu, and optionally at least one of up to 3.0% of Mo, up to 1.5% of Al, up to 0.5% of Ti, up to 0.5% of Nb, up to 0.5% of V, up to 0.5% of Zr, up to 0.03% of B and up to 0.02% of REM, the balance being Fe and unavoidable impurities, wherein the alloying elements are further adjusted so that both the two relations (1) and (2) noted below are satisfied:

$$K=.5+13.0\times C+.99\times Si-.1\times Mn-Ni-.4\times Cu +.4\times Cr+.1\times N \leq .5 \quad (1)$$

$$H=.1+60.9\times C+.26\times Si-Ni-.79\times Cu+.68\times Cr+.6\times N \leq .0 \quad (2)$$

The copper coating on each surface of the steel sheet preferably has a thickness of at least 1 μm, and it is preferable to provide a Ni coating of a thickness of not thicker than 1 μm between the copper coating and the steel sheet.

FUNCTION

For a purpose of providing multifold pipes having enhanced corrosion resistance, we have examined a relationship between composition of austenitic stainless steels and mechanical properties of cold rolled sheets made of austenitic stainless steels, and established quantitative relations between hardness and composition and between tensile strength and composition. Furthermore, we have produced many double tubes from cold rolled austenitic stainless steel sheets having various properties. As a result, we have obtained the following information.

According to the double tube production tests:

(1). Compared with low carbon mild steels, conventional austenitic stainless steels are hard and can only be mechanically formed into a double tube of a poor shape, which when heated for a self-brazing purpose, provides a copper fused layer having many voids. To avoid this, it is necessary that the starting steel sheet has reduced hardness and reduced tensile strength.

(2) Even with a double tube of a good shape, % void occurrence in the copper fused layer formed by self-brazing varies, depending upon an amount of copper coating and an amount of Ni coating lying under the copper coating.

According to the examination of a relationship between composition of austenitic stainless steels and mechanical properties of cold rolled sheets made of austenitic stainless:

(1) In order to reduce hardness, it is very effective to reduce C, N, Si, P, S, Al, Ti and other impurities, to reduce Cr, to increase Ni and Mn and to add Cu.

(2) In order to reduce tensile strength, it is effective to increase Ni and Mn, to add Cu and to reduce Si.

Based upon the above-described information the invention provides void free multifold pipes by using as a starting steel an austenitic stainless steel having alloying elements strictly adjusted. On each alloying element, functions and reasons for the numerical restriction will now be described.

If a considerable amount of C is contained, C renders the steel hard by its dissolution. Thus, C should be controlled to 0.05% or less. While a lower limit of C is not very critical, C may generally be contained in an amount of 0.005% or more.

Si is generally contained in an amount of at least 0.1% for a purpose of deoxygenation. However, from the view point of softness of the steel, the lower the Si the better. Since the deoxygenation effect of Si is saturated at 1.0% Si or higher, the upper limit of Si is now set as 1.0%.

The more the Mn content, the lower the hardness of the steel, the smaller the extent of work hardening and the lower the tensile strength of the steel. However, such effects of Mn are not appreciably enhanced by addition of Mn in amounts exceeding 5.0%, and, therefore, the upper limit of Mn is now set at 5.0%. While a lower limit of Mn is not very critical, Mn may generally be added in an amount of 0.05% or more.

Ni is an indispensable element for austenitic stainless steels and is required to be at least 9.0% in order to achieve satisfactorily low hardness and tensile strength. While an upper limit of Ni is not very critical, we set the upper limit of Ni 15.0% for an economical reason.

Cr should preferably be added in an amount of 15.0% from the view point of corrosion resistance. However, since addition of an excessive amount of Cr invites an increase in hardness of the steel, we set the upper limit of Cr at 20.0% from the view point of softness of the steel.

N is a very effective austenite former and serves to stabilize the austenite phase. However, since addition of N in excess of 0.04% invites an increase in hardness of the steel due to dissolution as well as deterioration of surface properties, N should be controlled to 0.04% or less. While a lower limit of N is not very critical, N may generally be contained in an amount of 0.004% or more.

Cu is an austenite former and very effectively acts to reduce hardness and tensile strength of the steel. However, since addition of Cu in excess of 5.0% deteriorates hot workability of the steel, resulting in edge breakage during hot rolling, Cu should be controlled to 5.0% or less. A lower limit of Cu is not critical, Cu may be contained in an amount as low as a trace.

Mo effectively enhances corrosion resistance of the steel. However, since the addition of an excessive amount of Mo renders the steel hard, Mo should be controlled to 3.0% or less.

Al is an element which is effective for deoxygenation during steel making, and in particular, when Al is added to molten steel prior to the addition of Ti and/or Zr, Al effectively reduces the oxygen concentration in the molten steel, whereby effective amounts of Ti and/or Zr added to the Al treated molten steel may be prevented from reducing and stabilized. However, since addition of Al in excess of 1.5% invites increase in hardness of the steel due to dissolution, Al should be controlled to 1.5% or less.

Ti, Nb, V and Zr serve to make grains finer and to prevent the deterioration of surface texture of articles shaped from the steel. However, since this effect is saturated by addition of each element in an amount of 0.5% or more, the upper limit of each element is now set at 0.5%.

B enhances hot workability of the steel and effectively prevents cracking during hot working. However, since addition of B in excess of 0.03% not only deteriorates hot workability of the steel but also adversely affects resistance to intergranular corrosion, B should be controlled to 0.03% or less.

REM (rare earth metals), like B, enhances hot workability of the steel. However, this effect cannot be further enhanced by addition of REM in excess of 0.02%, the upper limit of REM is now set at 0.02%.

In addition to the above-discussed prescription on proportions of individual elements, in order to avoid void occurrence in the copper fused layer formed by self-brazing, it is necessary to control hardness of the starting steel sheet and tensile strength of the starting steel sheet to be sufficiently low. We have examined the influence of hardness and tensile strength of the starting steel sheet on void occurrence as well as the influence of chemical composition of the steel on its hardness and tensile strength, and found that if alloying elements are strictly mutually adjusted so that the both conditions (1) $K \leq 19.5$ and (2) $H \leq 29.0$ are met, the steel has sufficiently low hardness and tensile strength, and the multifold pipe made thereof does not suffer from void occurrence (as described more specifically with reference to FIGS. 5 and 6).

Furthermore, since we have found that void occurrence further depends upon an amount of Ni coating and an amount of copper coating, tests for determining proper amounts of Ni and copper were carried out as noted below.

Each steel having a composition indicated in Table 1 was melted, continuously cast into a slab, hot rolled to a thickness of 3.8 mm at a drawing temperature of 1220° C., annealed at a temperature of 1100° C. for 1 minute, pickled, cold rolled to a thickness of 1.0 mm, annealed at a temperature of 1050° C. for 1 minute, pickled, finish rolled to a thickness of 0.3 mm, finish annealed at a temperature of 1050° C. for 1 minute, and pickled. Hardness and tensile strength of the cold rolled sheets of 14 species so prepared were determined and are indicated in Table 1 together with calculated K and H values of these steels.

TABLE 1

| Steel No. | C | Si | Mn | Ni | Cr | N | Cu | K value | HV[1] | H value | TS[2] | Remarks |
|---|---|---|---|---|---|---|---|---|---|---|---|---|
| 1 | 0.02 | 0.12 | 1.75 | 11.90 | 16.95 | 0.006 | 0.01 | 13.6 | 93 | 28.3 | 52.9 | B: 0.01%, Ti: 0.30% |
| 2 | 0.02 | 0.11 | 1.50 | 12.00 | 17.10 | 0.007 | 2.1 | 14.0 | 92 | 26.7 | 49.0 | Al: 0.25%, Zr: 0.33% |

TABLE 1-continued

| Steel No. | C | Si | Mn | Ni | Cr | N | Cu | K value | HV[1] | H value | TS[2] | Remarks |
|---|---|---|---|---|---|---|---|---|---|---|---|---|
| 3 | 0.02 | 0.10 | 0.11 | 12.21 | 17.05 | 0.006 | 3.9 | 14.5 | 96 | 23.7 | 45.8 | REM: 0.01%, Nb: 0.23% |
| 4 | 0.01 | 0.15 | 0.10 | 12.10 | 17.10 | 0.010 | 4.5 | 14.8 | 99 | 24.2 | 45.3 | V: 0.18%, Mo: 0.46% |
| 5 | 0.02 | 0.39 | 0.12 | 11.95 | 17.10 | 0.008 | 2.2 | 16.0 | 111 | 26.8 | 50.2 | |
| 6 | 0.02 | 0.40 | 0.10 | 12.11 | 17.00 | 0.010 | 2.0 | 16.1 | 107 | 26.8 | 51.0 | |
| 7 | 0.02 | 0.60 | 0.10 | 12.00 | 17.50 | 0.020 | 1.0 | 18.2 | 126 | 28.6 | 54.0 | |
| 8 | 0.01 | 0.10 | 0.12 | 11.53 | 18.60 | 0.009 | — | 17.6 | 118 | 29.3 | 55.5 | |
| 9 | 0.01 | 0.12 | 0.09 | 11.40 | 18.50 | 0.008 | — | 17.6 | 121 | 29.3 | 56.5 | |
| 10 | 0.07 | 0.43 | 1.25 | 11.21 | 18.11 | 0.018 | — | 18.6 | 125 | 33.5 | 61.0 | |
| 11 | 0.08 | 0.45 | 1.10 | 11.21 | 18.00 | 0.020 | — | 19.3 | 130 | 34.4 | 64.5 | |
| 12 | 0.01 | 1.50 | 0.09 | 11.41 | 19.40 | 0.010 | — | 19.6 | 133 | 30.4 | 54.9 | |
| 13 | 0.05 | 0.40 | 0.08 | 8.40 | 18.50 | 0.020 | — | 22.0 | 146 | 35.5 | 65.8 | |
| 14 | 0.06 | 0.50 | 1.00 | 8.55 | 18.30 | 0.025 | — | 22.4 | 149 | 36.2 | 69.1 | |

[1] HV: Vicker's hardness
[2] TS: Tensile strength (kgf/mm$^2$)

Figure 2:
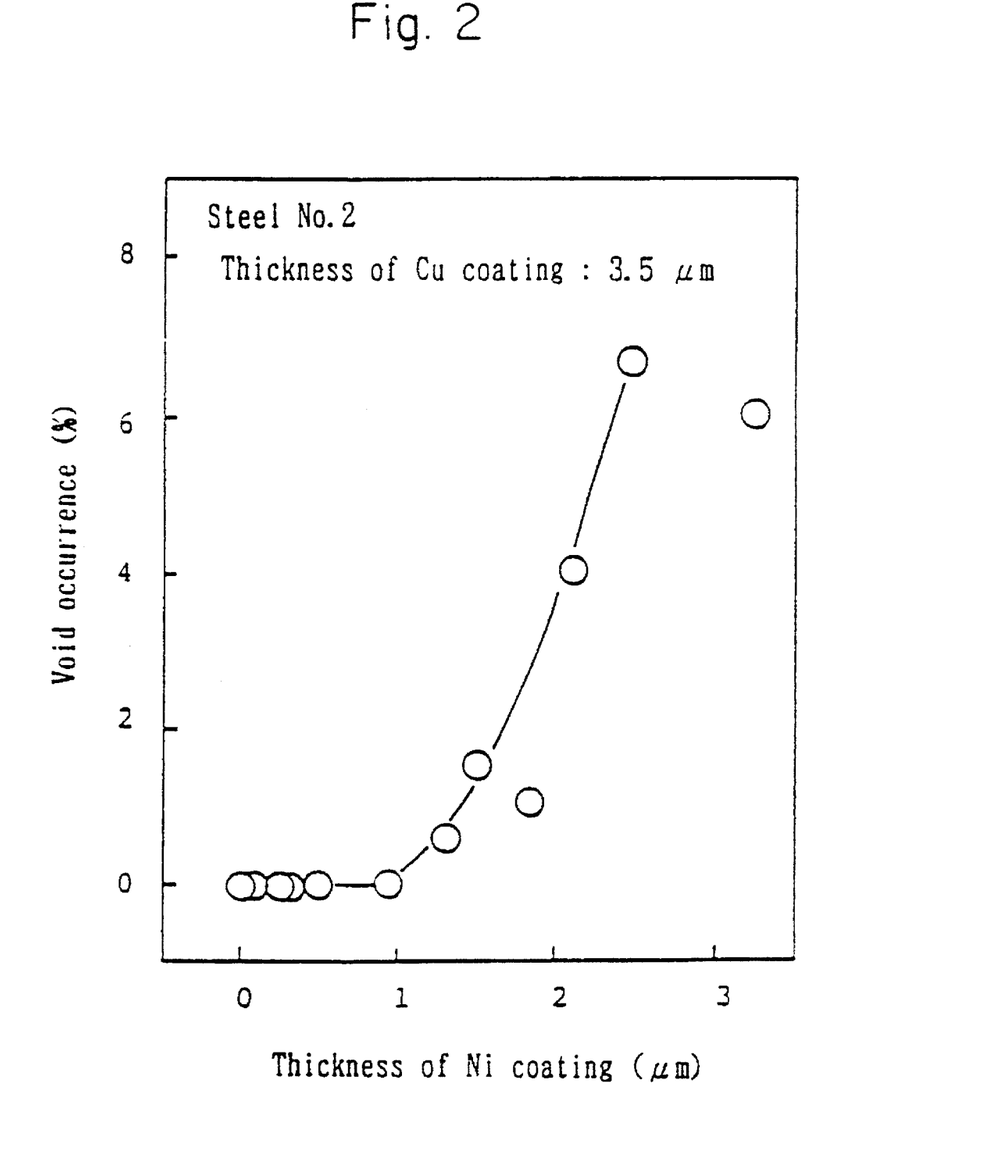
FIG. 2 shows % void occurrence plotted against thickness of Ni coating.

In one series of the tests, on each surface of the cold rolled sheet of Steel No. 2, a Ni coating having a varied thickness was applied, and on the Ni coating a copper coating having a thickness of 3.5 μm was applied. Each sheet so treated was formed into a double tube of a good shape having an inner diameter of 7.4 mm and an outer diameter of 8.0 mm and brazed at a temperature of 1125° C. On each product occurrence or non-occurrence of voids in the copper fused layer formed by self-brazing was examined by an eddy current defect detection method, and % void occurrence was determined. By the term "% void occurrence" is meant a percent of the number of 100 m long tubes having voids based on the number of 100 m long tubes examined. Test results are shown in FIG. 2. As revealed from FIG. 2, with a Ni coating having a thickness of 1 μm or less voids do not occur. Whereas with a Ni coating having a thickness exceeding 1 μm, voids occur. While it is advantageous to apply a Ni coating to enhance adhesion of the copper coating to the steel sheet, an excessively thick Ni coating should be avoided, since it causes voids to occur in the copper fused layer formed by self-brazing. A Ni coating, if any, should have a thickness of 1 μm or less.

Figure 3:
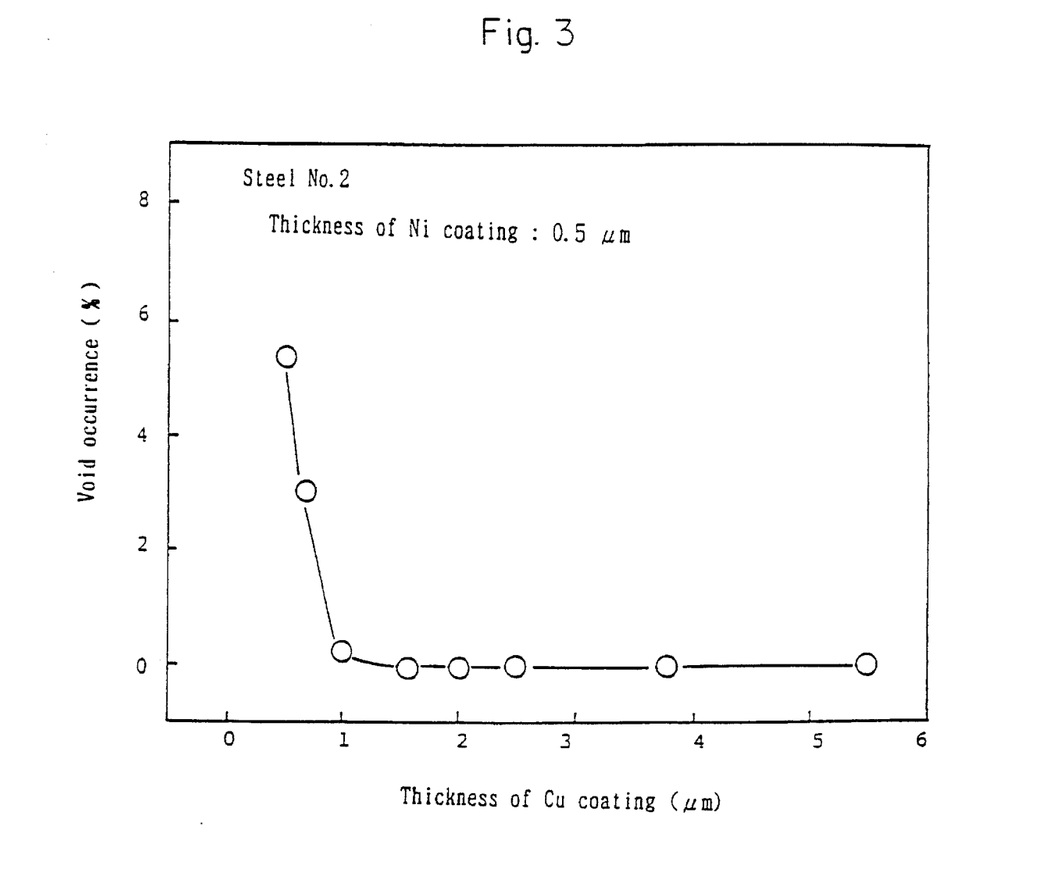
FIG. 3 shows % void occurrence plotted against thickness of copper coating.

In another series of the tests, on each surface of the cold rolled sheet of Steel No. 2, a Ni coating having a thickness of 0.5 μm was applied, and on the Ni coating a copper coating having a varied thickness of was applied. Each sheet so treated was formed into a double tube of a good shape and brazed as in the above-described series of the tests. On each product, occurrence or non-occurrence of voids in the copper fused layer formed by self-brazing was examined by an eddy current defect detection method, and % void occurrence was determined. Test results are shown in FIG. 3. FIG. 3 illustrates % void occurrence plotted against thickness of copper coating. It is understood that a desirably low % void occurrence of 0.5% or less (the level of % void occurrence which has been obtainable with low carbon mild steels) can only be achieved when the copper coating has a thickness of at least 1 μm.

Figure 4:
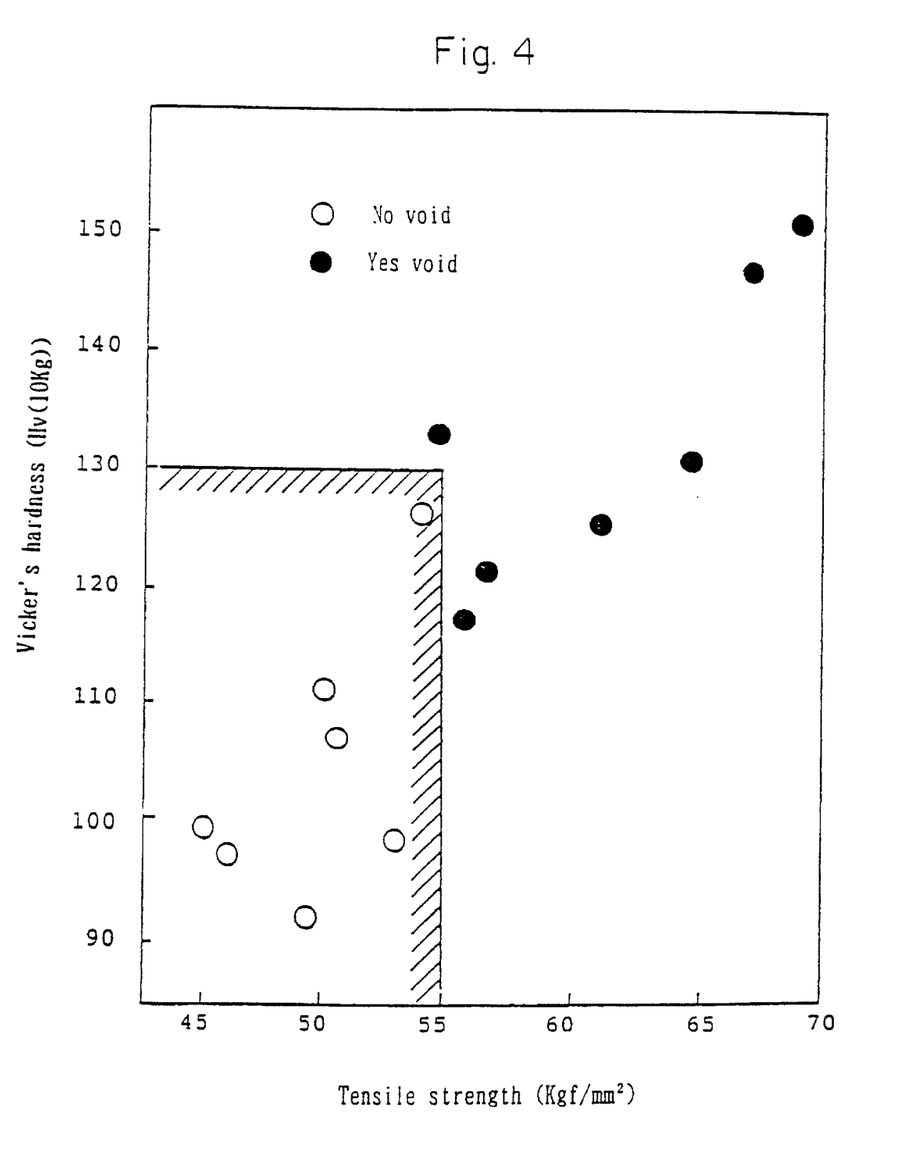
FIG. 4 shows the effects of hardness and tensile strength of a stainless steel sheet on void occurrence of a double tube made of the stainless steel sheet.

Each cold rolled sheet of 14 steel species indicated in Table 1 having a Ni coating of a thickness of 0.5 μm and a copper coating of a thickness of 3.5 μm of the Ni coating, was formed into a 100 m long double tube having an inner diameter of 7.4 mm and an outer diameter of 8.0 mm and brazed at a temperature of 1125° C. On each product, occurrence or non-occurrence of voids in the copper fused layer formed by self-brazing was examined. Results are shown in FIG. 4 which represents effects of hardness and tensile strength of stainless steel sheet on void occurrence of a double tube made of the stainless steel sheet. In FIG. 4, blank circles designate no voids and solid circles indicate voids. From FIG. 4, it is understood that in order to avoid void occurrence, the starting steel sheet should have a hardness lower than HV 130 and a tensile strength lower than 55 kgf/mm$^2$.

Figure 5:
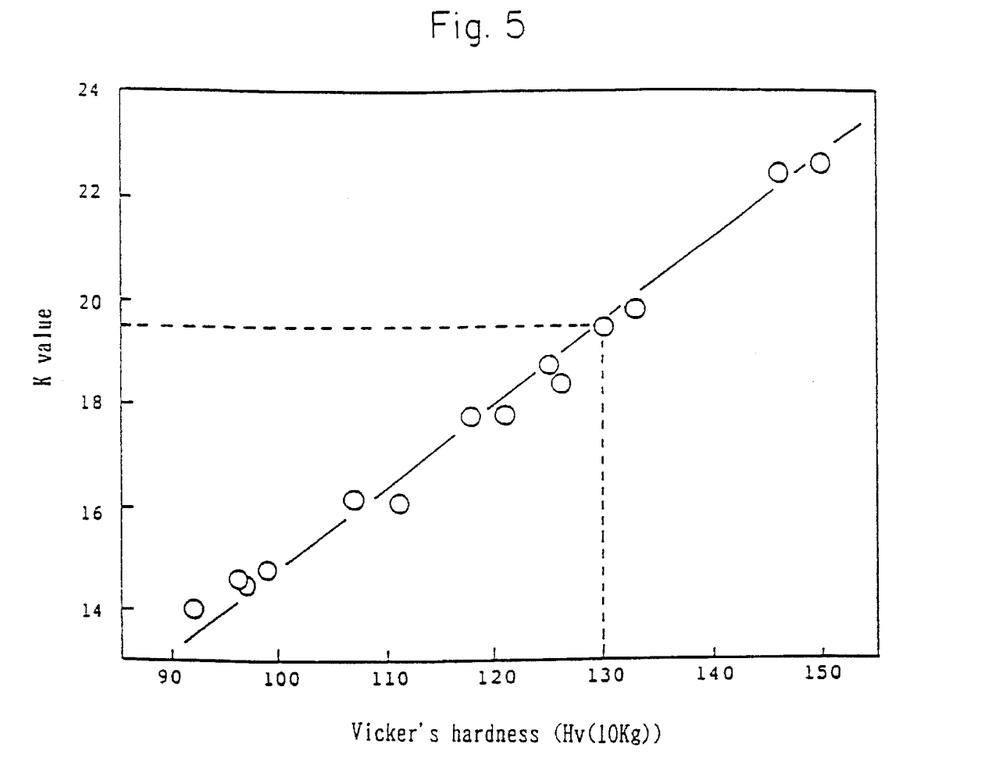
FIG. 5 shows a relationship between the hardness of cold rolled austenitic stainless steel sheet and its K value.

FIG. 5 shows a relationship between hardness of cold rolled steel sheet and its K value on the tested sheets of 14 species indicated in Table 1. It is understood that there is a good correlation between hardness and K value, and that in order to achieve a hardness lower than HV 130, which is necessary to avoid void occurrence, the alloying elements should be adjusted so that the K value is not greater than 19.5.

Figure 6:
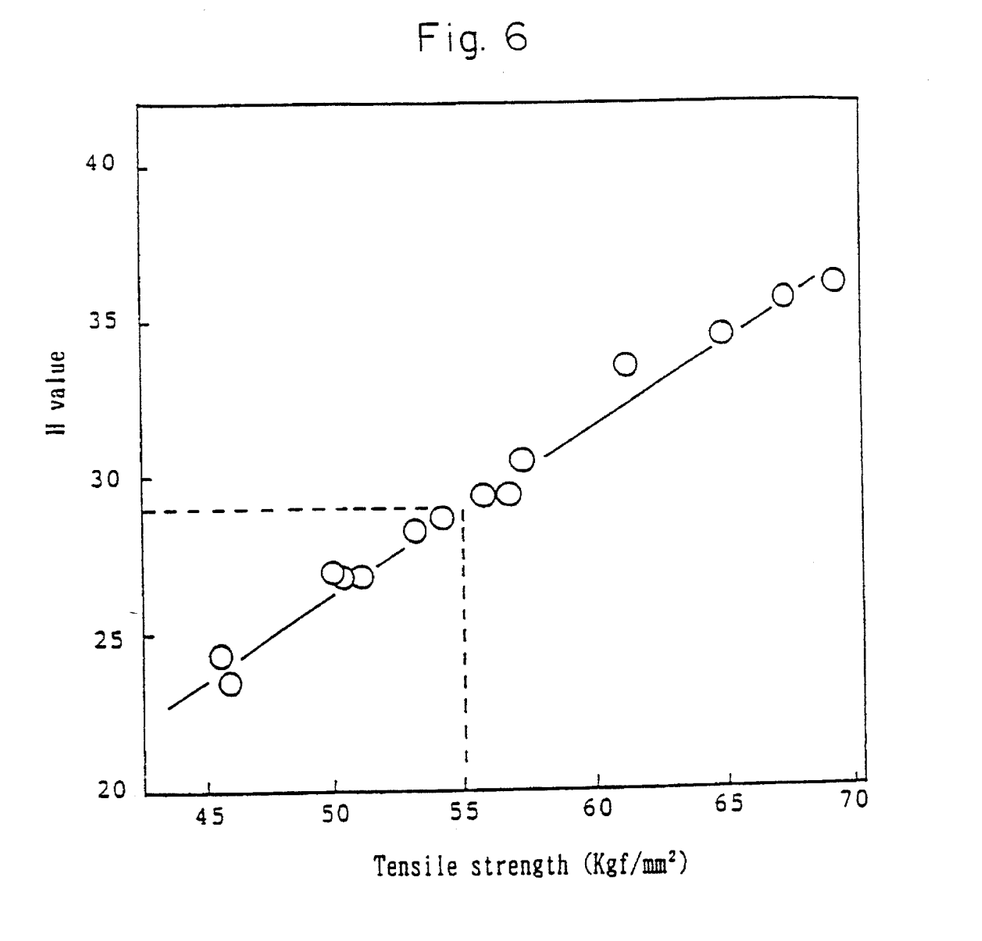
FIG. 6 shows a relationship between the tensile strength of cold rolled austenitic stainless steel sheet and its H value.

FIG. 6 shows a relationship between tensile strength of cold rolled steel sheet and its H value on the tested sheets of 14 species indicated in Table 1. It is understood that there is a good correlation between tensile strength and H value, and that in order to achieve a tensile strength lower than 55 kgf/mm$^2$, which is necessary to avoid void occurrence, the alloying elements should be adjusted so that the H value is not greater than 29.0.

EXAMPLES

The invention will be further illustrated by the following examples. Table 2 indicates composition of steels according to the invention, control steels and conventional steels together with their calculated K and H values. The used conventional steels included SUS304, SUS304L and SUS305. All steels according to the invention had their alloying elements adjusted so that K≦19.5 and H≦29.0 were met.

Each austenitic stainless steel having a composition indicated in Table 2 was melted, continuously cast into a slab, hot rolled to a thickness of 3.8 mm at a drawing temperature of 1220° C., annealed at a temperature of 1100° C. for 1 minute, pickled, cold rolled to a thickness of 1.0 mm, annealed at a temperature of 1050° C. for 1 minute, pickled, finish rolled to a thickness of 0.3 mm, finish annealed at a temperature of 1050° C. for 1 minute, and pickled. On both surfaces of each cold rolled strip so prepared, a copper coating having a thickness of 3.5 μm was applied, and the so treated strip was formed into a double tube and brazed at a temperature of 1125° C. On each product, % void occurrence was determined in the manner described above. Results are shown in FIG. 3, together with measured Vicker's hardness and tensile strength of each strip used.

having unduly high K and H values have unduly high hardness and tensile strength, and produce double tubes which suffer from void occurrence.

TABLE 2

| | Steel No. | C | Si | Mn | Ni | Cr | N | Cu | Others | K value | H value | Remarks |
|---|---|---|---|---|---|---|---|---|---|---|---|---|
| A | 15 | 0.01 | 0.13 | 0.15 | 12.11 | 17.33 | 0.009 | 0.01 | | 16.3 | 27.9 | |
| | 16 | 0.01 | 0.10 | 0.18 | 12.13 | 17.08 | 0.008 | 2.1 | | 15.4 | 25.9 | |
| | 17 | 0.01 | 0.11 | 0.15 | 11.97 | 17.05 | 0.008 | 4.1 | Ti: 0.21%, Nb: 0.35% | 14.7 | 24.6 | |
| | 18 | 0.01 | 0.11 | 0.10 | 11.55 | 18.40 | 0.007 | 3.5 | Al: 0.30%, Zr: 0.31% | 15.9 | 26.3 | |
| | 19 | 0.04 | 0.10 | 2.50 | 12.01 | 17.01 | 0.011 | 2.1 | | 13.7 | 28.1 | |
| | 20 | 0.02 | 0.70 | 0.11 | 11.97 | 16.99 | 0.010 | 4.5 | | 15.5 | 25.1 | |
| | 21 | 0.02 | 0.11 | 0.86 | 14.01 | 18.51 | 0.009 | 2.0 | | 13.6 | 25.8 | |
| | 22 | 0.02 | 0.10 | 1.49 | 9.50 | 15.50 | 0.009 | 4.5 | B: 0.02%, REM: 0.01% | 15.2 | 26.3 | |
| | 23 | 0.02 | 0.20 | 1.52 | 14.80 | 18.30 | 0.030 | 3.0 | Mo: 0.40%, V: 0.33% | 14.6 | 25.0 | |
| B | 24 | 0.01 | 0.09 | 0.15 | 11.50 | 18.50 | 0.008 | — | | 17.4 | 29.3 | |
| | 25 | 0.06 | 0.09 | 0.12 | 11.42 | 18.43 | 0.008 | — | | 18.1 | 32.3 | |
| | 26 | 0.01 | 0.79 | 0.10 | 11.43 | 18.56 | 0.009 | — | | 18.4 | 39.6 | |
| | 27 | 0.01 | 0.08 | 0.21 | 8.50 | 18.31 | 0.008 | — | | 20.2 | 32.1 | |
| C | 28 | 0.06 | 0.55 | 0.83 | 8.47 | 18.42 | 0.026 | — | | 22.5 | 36.4 | SUS304 |
| | 29 | 0.02 | 0.57 | 1.06 | 10.03 | 18.34 | 0.021 | — | | 19.9 | 32.2 | SUS304L |
| | 30 | 0.08 | 0.50 | 1.00 | 11.01 | 18.03 | 0.021 | — | | 19.4 | 34.4 | SUS305 |

A: Steels according to the invention
B: Control steels
C: Conventional steels

TABLE 3

| | Steel No. | HV[1] | TS[2] | Void occurrence (%) |
|---|---|---|---|---|
| A | 15 | 109 | 54.0 | 0 |
| | 16 | 103 | 49.3 | 0 |
| | 17 | 98 | 46.7 | 0 |
| | 18 | 102 | 48.6 | 0 |
| | 19 | 90 | 53.0 | 0 |
| | 20 | 105 | 47.9 | 0 |
| | 21 | 92 | 49.2 | 0 |
| | 22 | 100 | 50.0 | 0 |
| | 23 | 95 | 48.2 | 0 |
| B | 24 | 116 | 55.6 | 0.75 |
| | 25 | 124 | 60.4 | 1.30 |
| | 26 | 145 | 60.5 | 2.56 |
| | 27 | 135 | 61.3 | 2.30 |
| C | 28 | 151 | 69.1 | 6.50 |
| | 29 | 135 | 60.5 | 4.80 |
| | 30 | 129 | 65.4 | 3.15 |

[1]HV: Vicker's hardness
[2]TS: Tensile strength (kgf/mm$^2$)
A: Steels according to the invention
B: Control steels
C: Conventional steels As seen from Table 2, conventional Steels No. 28 (SUS304) and No. 29 (SUS 304L) having a hardness in excess of HV 130 and a tensile strength in excess of 55 kgf/mm$^2$ provide double tubes having high % void occurrence of 6.5% and 4.8%, respectively. Conventional Steel No. 30 (SUS305) has a hardness lower than HV 130, but it has an unduly high tensile strength, and in consequence, a double tube formed thereof has a poor shape and, when brazed, voids occur.

Control steels Nos 24 and 25 have a hardness lower than HV 130. But they have an unduly high H value and an unduly high tensile strength of 56 kgf/mm$^2$ and 60 kgf/mm$^2$, respectively. Accordingly, they are indicative of double tubes which suffer from void occurrence. Control Steel No. 26 having an unduly high H value and Control Steel No. 27

In contrast, Steels Nos 15 through 23 according to the invention having alloying elements adjusted as prescribed herein have a hardness lower than HV 120 and a tensile strength lower than 55 kgf/mm$^2$ and are indicative of double tubes of % void occurrence of 0%, which is far better than void occurrence of 3.15–6.5% with Conventional Steels and void occurrence of 0.75–2.65% with Control Steels.

EFFECT OF THE INVENTION

The multifold pipes according to the invention have no voids in the copper fused layer formed by self-brazing in spite of the fact that stainless steel sheets are fused, ensuring good fluid tightness and safety. Furthermore, the products according to the invention have excellent corrosion resistance which cannot be attained by known multifold pipes made of low carbon mild steels and exhibit higher strength than those made of ordinary mild steels. Accordingly, the multifold pipes according the invention reduce necessary pipe weight and to increase durability of pipe equipments.

We claim:

1. A multifold pipe made by multiple rolling up and turning of a copper coated steel sheet into a multifold pipe, characterized in that said steel sheet is a cold rolled sheet of a super soft austenitic stainless steel comprising alloying elements by weight: up to 0.05% of C, up to 1.0% of Si, between 0 and less than 5.0% of Mn, from 9.0% to 15.0% of Ni, from 15.0% to 20.0% of Cr, up to 0.04% of N, up to 5.0% of Cu, the balance being Fe and unavoidable impurities, wherein the alloying elements are further adjusted so that both relations (1) and (2) defining valves K and H are satisfied:

$$K = .5 + 13.0 \times C + .99 \times Si - .1 \times Mn - Ni - .4 \times Cu + .4 \times Cr + .1 \times N \leq .5 \quad (1)$$

$$H = .1 + 60.9 \times C + .26 \times Si - Ni - .79 \times Cu + .68 \times Cr + .6 \times N \leq .0 \text{ and said super soft} \quad (2)$$

austenitic steel has a hardness less than HV 130 and a tensile strength lower than 55 kgf/mm².

2. The multifold pipe according to claim 1 wherein said copper coated steel sheet has a copper coating of a thickness of at least 1 μm applied on each surface of the sheet.

3. The multifold pipe according to claim 1 wherein said copper coated steel sheet has a nickel coating of a thickness of not thicker than 1 μm applied on each surface of the sheet and a copper coating of a thickness of at least 1 μm on each surface of the nickel coating.

4. The multifold pipe according to claim 1 wherein said super soft austenitic stainless steel comprises alloying elements by weight: from 0.005% to 0.05% of C, from 0.1% to less than 1.0% of Si, from 0.05% to 5.0% of Mn, from 9.0% to 15.0% of Ni, from 15.0% to 20.0% of Cr, from 0.004% to 0.04% of N, up to 5.0% of Cu, the balance being Fe and unavoidable impurities, wherein the alloying elements are further adjusted so that both relations (1) and (2) defining valves K and H are satisfied:

$$K = .5 + 13.0 \times C + .99 \times Si - .1 \times Mn - Ni - .4 \times Cu + .4 \times Cr + .1 \times N \leq .5 \quad (1)$$

$$H = .1 + 60.9 \times C + .26 \times Si - Ni - .79 \times Cu + .68 \times Cr + .6 \times N \leq .0 \quad (2)$$

5. A multifold pipe made by multiple rolling up and turning of a copper coated steel sheet into a multifold pipe, characterized in that said steel is a cold rolled sheet of a super soft austenitic stainless steel comprising allowing elements by weight: up to 0.05% of C, up to 1.0% of Si, up to 5.0% of Mn, from 9.0% to 15.0% of Ni, from 15.0% to 20.0% of Cr, up to 0.04% of N, up to 5.0% of Cu, and at least one of up to 3.0% of Mo, up to 1.5% of Al, up to 0.5% of Ti, betweem zero and less than 0.5% of Nb, up to 0.5% of V, up to 0.5% of Zr, up to 0.03% of B and up to 0.02% of REM, the balance being Fe and unavoidable impurities, wherein the alloying elements are further adjusted so that both relations (1) and (2) defining valves K and H are satisfied:

$$K = .5 + 13.0 \times C + .99 \times Si' .1 \times Mn - Ni - .4 \times Cu + .4 \times Cr + .1 \times N \leq .5 \quad (1)$$

$$H = .1 + 60.9 \times C + .26 \times Si - Ni - .79 \times Cu + .68 \times Cr + .6 \times N \leq .0 \text{ and said super soft} \quad (2)$$

austenitic steel has a hardness less than HV 130 and a tensile strength lower than 55 kgf/mm².

6. The multifold pipe according to claim 5 wherein said copper coated steel sheet has a copper coating of a thickness of at least 1 μm applied on each surface of the sheet.

7. The multifold pipe according to claim 5 wherein said copper coated steel sheet has a nickel coating of a thickness of not thicker than 1 μm applied on each surface of the sheet and a copper coating of a thickness of at least 1 μm applied on the surface of each nickel coating.

8. The multifold pipe according to claim 5 wherein said super soft austenitic stainless steel comprises alloying elements by weight: from 0.005% of C, from 0.1% to less than 1.0% of Si, from 0.05 to 5.0% of Mn, from 9.0% to 15.0% of Ni, from 15.0% to 20.0% of Cr, from 0.004% to 0.04% of N, up to 5.0% of Cu, and at least one of up to 3.0% of Mo, up to 1.5% of Al, up to 0.5% of Ti, up to 0.5% of Nb, up to 0.5% of V, up to 0.5% of Zr, up to 0.03% of B and up to 0.02% of REM, the balance being Fe and unavoidable impurities, wherein the alloying elements are further adjusted so that both relations (1) and (2) defining valves K and H are satisfied:

$$K = .5 + 13.0 \times C + .99 \times Si - .1 \times Mn - Ni - .4 \times Cu + .4 \times Cr + .1 \times N \leq .5 \quad (1)$$

$$H = .1 + 60.9 \times C + .26 \times Si - Ni - .79 \times Cu + .68 \times Cr + .6 \times N \leq .0 \quad (2)$$

9. The multifold pipe according to claim 1 wherein silicon ranges between 0 and 0.70%.

10. The multifold pipe according to claim 5 wherein silicon ranges between 0 and 0.70%.

* * * * *